United States Patent
Peeters et al.

(10) Patent No.: US 12,380,229 B2
(45) Date of Patent: Aug. 5, 2025

(54) RESOURCE ACCESS SECURITY FOR MULTIPLE SOFTWARE CONTEXTS

(71) Applicant: Texas Instruments Incorporated, Dallas, TX (US)

(72) Inventors: Eric Thierry Jean Peeters, Frisco, TX (US); Gary Augustine Cooper, Oakmont, PA (US); Robin Osa Hoel, Oslo (NO); Ruchi Shankar, Bengaluru (IN); Prachi Mishra, Ahmedabad (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 284 days.

(21) Appl. No.: 17/401,958

(22) Filed: Aug. 13, 2021

(65) Prior Publication Data
US 2023/0050729 A1 Feb. 16, 2023

(51) Int. Cl.
*G06F 21/60* (2013.01)
(52) U.S. Cl.
CPC .................................. *G06F 21/604* (2013.01)
(58) Field of Classification Search
CPC .................................................... G06F 21/604
See application file for complete search history.

(56) References Cited

U.S. PATENT DOCUMENTS

| | | | | |
|---|---|---|---|---|
| 6,070,200 A | * | 5/2000 | Gates | G06F 13/122 710/21 |
| 2010/0287424 A1 | * | 11/2010 | Kwon | G06F 9/4401 711/147 |
| 2017/0220489 A1 | * | 8/2017 | Ahmed | G06F 12/1441 |
| 2017/0371570 A1 | * | 12/2017 | Wokhlu | G06F 12/084 |
| 2019/0370502 A1 | * | 12/2019 | Swoboda | G06F 21/62 |

* cited by examiner

*Primary Examiner* — Kevin Bechtel
*Assistant Examiner* — Forrest L Carey
(74) *Attorney, Agent, or Firm* — Michael T. Gabrik; Frank D. Cimino

(57) ABSTRACT

In described examples, a processor system includes a mailbox, a hardware security functional block (HSFB, also called a trusted agent herein), a processor, and a processor firewall. The HSFB includes a database configured to store at least one software context access rule. The processor executes multiple software contexts. The HSFB approves or denies an access request received from a debugging tool, via the mailbox, in response to the database and a software context identification (ID) included in the access request. The HSFB sends a message to the processor firewall indicating whether the access request is approved. The processor firewall determines whether to pass instructions to the processor for execution with respect to the identified software context in response to the message.

19 Claims, 4 Drawing Sheets

RESOURCE ACCESS SECURITY FOR MULTIPLE SOFTWARE CONTEXTS

TECHNICAL FIELD

This application relates generally to resource access control, and more particularly to controlling access by debugging tools to memories and secure intellectual property resources.

BACKGROUND

In some applications, software reverse engineering (SRE) is the process of analyzing a subject system to identify the system's components and their interrelationships and to create representations of the system in another form or at a higher level of abstraction. There are various ways to implement SRE. For example, an engineer can observe a software's effects while executing the software in a processor (such as a central processing unit, or CPU, or a digital signal processor, or DSP). In particular, the engineer can observe effects on processor general purpose registers, or on updates of statically allocated memory (the stack) or dynamically allocated memory (the heap).

FIG. 1 shows an example prior art functional block layout of a resource access control debugging system 100. A debugger tool 102 sends a resource access request 104 to a debug control block 106. If the resource access request 104 is authorized by the debug control block 106, the debugger tool 102 is given access to memories and other device resources in a trusted island 108 that includes protected, secured resources. If the resource access request 104 is not authorized by the debug control block 106, the debugger tool 102 is only provided access to an untrusted island 110, which includes only resources without the protected, secured status. Access to the trusted island 108 can also include access to the untrusted island 110.

SUMMARY

In described examples, a processor system includes a mailbox, a hardware security functional block (HSFB, also called a trusted agent herein), a processor, and a processor firewall. The HSFB includes a database configured to store at least one software context access rule. The processor executes multiple software contexts. The HSFB approves or denies an access request received from a debugging tool, via the mailbox, in response to the database and a software context identification (ID) included in the access request. The HSFB sends a message to the processor firewall indicating whether the access request is approved. The processor firewall determines whether to allow access to the processor internal state with respect to the identified software context running on the processor in response to the message.

DETAILED DESCRIPTION

Figure 1:
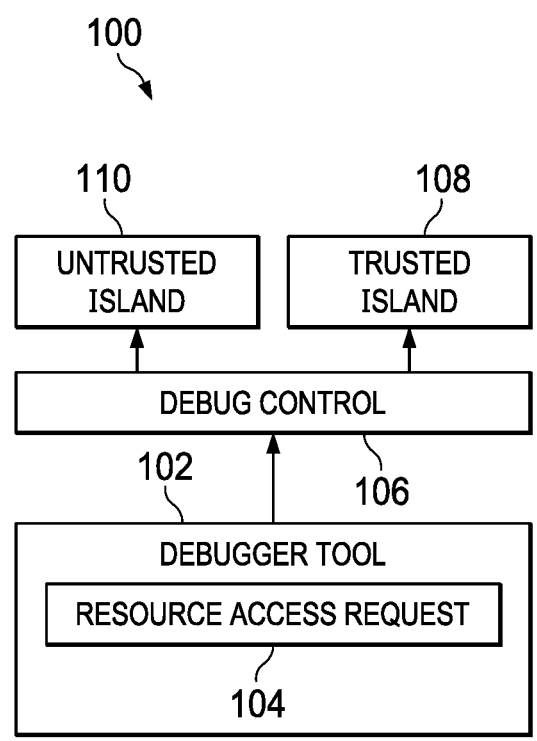
FIG. 1 shows an example prior art functional block layout of a debugging system.
Figure 2:
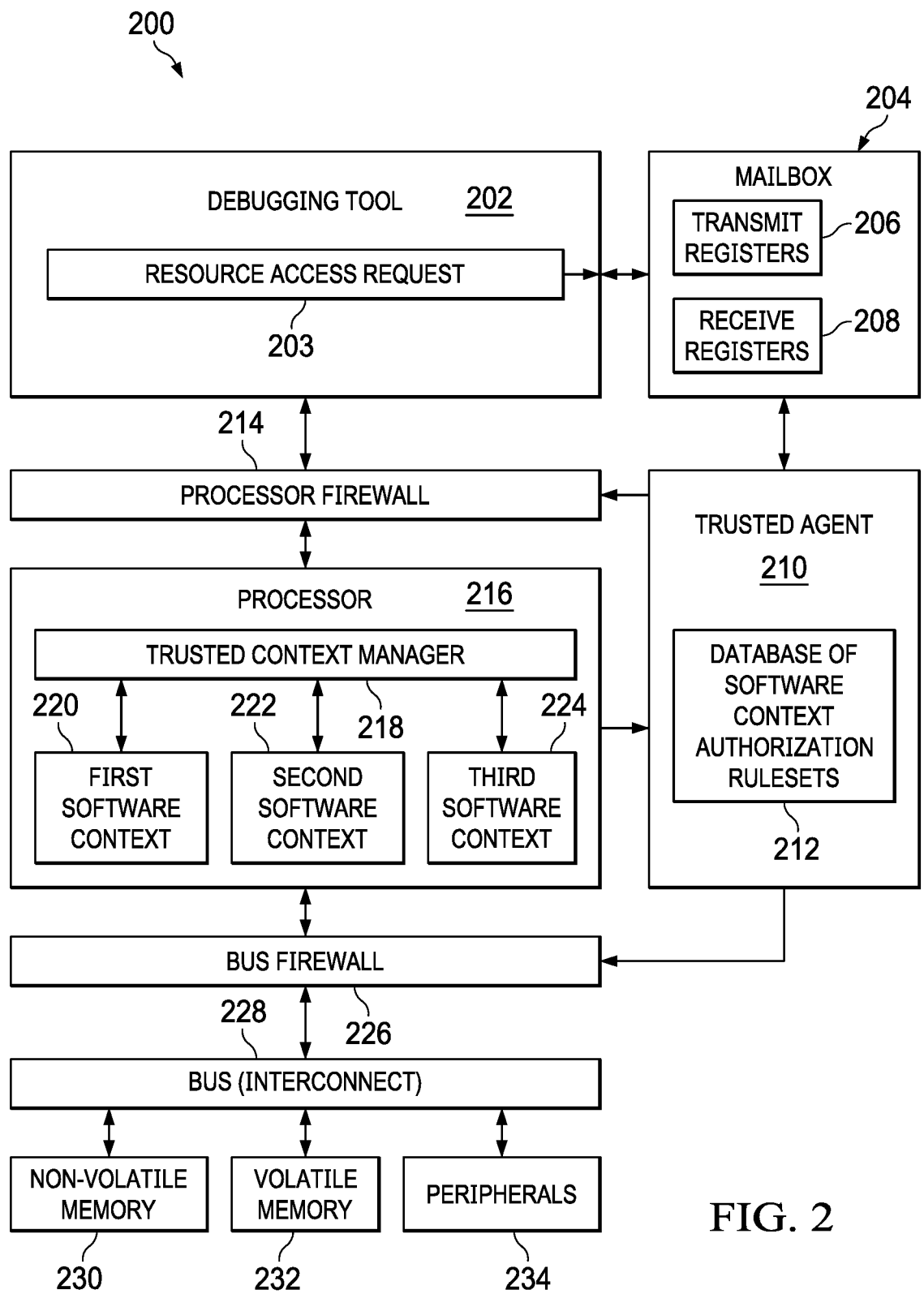
FIG. 2 shows an example functional block layout of a debugging system using multiple mutually secure software contexts.

FIG. 2 shows an example functional block layout of a system 200 for debugging using multiple mutually secure software contexts. A software context is a relatively minimal set of data, used by a software task, that if saved will allow the task to be interrupted and, later, resumed based on the saved data. Each software context is characterized by uniquely allocated resources such as RAM, ROM, or Flash memory regions, or access to one or more hardware-based intellectual property (IP) resources (also called peripherals). Access to software contexts is restricted, as described herein with respect to FIGS. 2, 3, and 4. Access to a software context currently executing on a processor corresponds to allowing instructions to be executed by the processor with respect to the currently executing software context and corresponding uniquely allocated resources. Software and data have value. Segregation of memory-stored resources into separately secure software contexts can help prevent unauthorized processes (and accordingly, unauthorized users) from obtaining improper access to stored resources. For example, such segregation can help prevent use of unauthorized software debugging to enable SRE.

As further described below, a debugging tool 202 generates resource access requests 203. A mailbox 204 has transmit registers 206 and receive registers 208. The debugging tool 202 sends the resource access requests 203 to the transmit register 206 and sends instructions to a processor 216 via a processor firewall 214. The processor firewall 214 is a hardware firewall located on the debug communications path (between the debugging tool 202 and the processor 216). The processor is part of an integrated circuit (IC, or chip). The mailbox 204 sends the resource access request 203 to a trusted agent 210. The trusted agent 210 is a hardware security IP (a hardware security functional block), and includes a memory storing a database of software context access authorizations 212. The trusted agent 210 generates a grant/fault message in response to the resource access request 203 and the database of software context authorizations 212. (A grant message in response to a resource access request 203 is also referred to herein as the resource access request 203 being approved.) The trusted agent 210 sends the grant/fault messages to the receive register 208, to the processor firewall 214, and to a bus firewall 226. The processor firewall 214 functions as a gate, either passing or not passing the accesses from the debugging tool 202 to the processor 216, in response to the trusted agent grant/fault message.

The processor 216 executes instructions passed by the processor firewall 214. The processor 216 includes multiple software contexts available to the processor for execution, including for example a first software context 220, a second software context 222, and a third software context 224. The processor 216 can run one software context at a time. The processor 216 also includes a trusted context manager 218. The trusted context manager 218 tracks the software context currently being executed by the processor 216 and sends a message to the trusted agent 210 when there is a context switch, notifying the trusted agent 210 of the switched-to software context. The processor 216 is connected to a bus 228 via a bus firewall 226 (also called a stall block from its function), which prevents instructions from passing from the processor 216 to the bus 228 during a context switch. The bus firewall 214 is a hardware firewall located to control communications between the processor 216 and the bus 228. The bus 228 is connected to multiple resources, including a non-volatile memory 230, a volatile memory 232, and peripherals 234. When a software context ID match occurs, the processor 216 continues execution. The debugging tool 202 is able to access the processor 216 and associated resources or halt the processor 216 execution interspersed with execution of ongoing software context, provided the debugging tool 202 gets permission to do so from the trusted agent 210.

The debugging tool 202 is a user level process, such as a debugger probe or other software test tool, executing externally from the processor 216 and communicating with the IC through input/output (I/O) functional blocks (not shown). The debugging tool 202 generates the resource access request 203 with respect to a specified software context. A resource access request 203 corresponds to an open debug command, which is a request to start debugging with respect to a respective specified software context and the memory and peripheral resources corresponding to the respective specified software context. A specified software context is a software context that the debugging tool 202 seeks to debug while the specified software context is executed by the processor 216. The resource access request 203 specifies the software context by providing an identification (ID) of the specified software context.

The debugging tool 202 transmits the resource access request 203 to the mailbox 204 by writing the resource access request 203 to the transmit register 206 of the mailbox 204. The mailbox 204 generates an interrupt based on a received resource access request 203, and transmits the interrupt to the trusted agent 210. Usefully, the mailbox 204 is hardware-based.

The trusted agent 210 can provide authorization to access a particular software context in response to an interrupt received from the mailbox 204. An interrupt is a desirable form of message from the mailbox 204 to the trusted agent 210 because the trusted agent 210 can be busy performing other user applications. Sending the message as an interrupt is useful to improve efficiency.

Recall the trusted agent 210 includes the database of software context access authorizations 212. The database of software context access authorizations 212 contains authorization rulesets for software contexts that can be executed by the processor 216. Rulesets are IDs of software contexts, along with IDs of the resources that respective software contexts are allowed to access—accordingly, IDs of regions of non-volatile memory 230, volatile memory 232, and peripherals 234 uniquely associated with respective software contexts. Authorization rulesets are used to determine whether the software context ID provided by a mailbox 204 transmitted interrupt corresponds to the software context ID included in the authorization ruleset. Authorization rulesets also determine whether a software context can be debugged, and whether the software context is allowed to share associated resources with one or more other software contexts. The trusted agent 210 also maintains an indicator of the currently-executed software context, for example by the respective software context ID. Further, when a software context switch occurs, so that the processor 216 changes which software context is currently being executed, the trusted agent 210 updates the authorization rulesets to indicate the new (switched-to) currently executing software context.

The trusted agent 210 grants or denies debug resource access based on the interrupt and the database of software context access authorizations 212. Access grant corresponds to access authorization, and access denial corresponds to an authorization failure (also referred to herein as a fault). An access grant corresponds to, for example, a match between the software context ID included in the mailbox 204 interrupt (and the corresponding resource access request 203), and an ID of a software context currently being executed by the processor 216. Access denial (or fault) corresponds to, for example, a mismatch between the software context ID included in the interrupt (and the corresponding resource access request 203), and the ID of the software context currently being executed by the processor 216. The trusted agent 210 generates a grant/fault message based on the result of this comparison, and on whether the authorization ruleset for the currently executing software context ID indicates that debugging of the currently executing software context ID is allowed. The grant/fault message indicates grant or denial of resource access. In some examples, the grant/fault message also specifies which resource(s) instructions from the debug tool are allowed to access according to the corresponding authorization ruleset.

The trusted agent 210 transmits the grant/fail message to the mailbox 204 and to the processor firewall 214, communicating the grant or denial of resource access with respect to the interrupt (and the corresponding resource access request 203). Accordingly, the trusted agent 210 is connected to communicate to the processor firewall 214 whether a resource access request 203 is approved. The trusted agent 210 also transmits the grant/fault message to the mailbox 204 by sending the message to the receive register 208 of the mailbox 204. The debugging tool 202 can read the grant/fail message from the receive register 208 to check whether the trusted agent 210 authorized the resource access request 203.

When the processor 216 changes the software context it is executing, there is no longer a match between a previously-granted access by the trusted agent 210 and a message, preceding the context change, that requested and was granted access to the previously-executing context (for example, by an ID match). Accordingly, a processor context switch causes the trusted agent 210 to send a grant/fault message to the processor firewall 214 indicating denial of resource access in response to the context switch, as the context switch makes obsolete a previous match between a software context ID included in a resource access request 203 and a software context ID of a software context that was being executed immediately prior to the context switch.

The processor firewall 214 controls traffic through debug access ports of a processor 216, enabling the processor firewall 214 to fully restrict access by a debugging tool 202 to debug functions of the processor 216. The processor firewall 214 receives, and controls traffic in response to, grant/fault messages from the trusted agent 210. If the processor firewall 214 receives a grant/fault message from the trusted agent 210 granting access, the processor firewall 214 passes subsequent instructions (accesses) sent from the debugging tool 202 to the processor 216 until the processor firewall 214 receives a grant/fault message from the trusted agent 210 signaling access denial. Accordingly, a grant/fail message from the trusted agent 210 to the processor firewall 214 communicating an access grant (affirmative authorization) provides access to instructions with respect to the software context currently being executed by the processor 216 until the processor 216 performs a context switch, changing the software context being executed by the processor 216. Instructions from the debugging tool 202 to the processor 216 can include, for example, memory or peripheral access instructions.

The processor 216 includes a trusted context manager 218 and multiple software contexts, such as the first software context 220, the second software context 222, and the third software context 224. Each of the multiple software contexts of the processor 216, including the first, second, and third software contexts 220, 222, and 224, includes a unique corresponding software context ID. One of the software contexts of the processor 216, such as the first, second, and third software contexts 220, 222, 224, can be currently running (executing) on the processor 216.

The trusted context manager 218 is immutable software running on the processor 216 that indicates the current software context (the context currently being executed by the processor 216). Here, immutable means that the trusted context manager 218 is software that can only be programmed once and then cannot be modified. The trusted context manager 218 of the processor 216 stores the software context ID of the software context currently being executed by the processor 216 (also referred to as the current switched context). The trusted context manager 218 communicates to the trusted agent 210 the software context ID of the software context that the processor 216 is switching to when the processor 216 switches contexts. A software context that the processor 216 switches to becomes the software context currently being executed by the processor 216 after the context switch is completed. As described above, the trusted agent 210 sends a grant/fault message to the processor firewall 214 denying access after receiving a message from the trusted context manager 218 indicating a context switch.

For example, if the processor 216 is currently executing the second software context 222, and a resource access request 203 includes the software context ID of the second software context 203, then the trusted agent 210 will generate a grant/fail message granting passage of subsequent instructions from the debugging tool 202 to the processor 216. If the processor 216 is currently executing the third software context 224, and the resource access request 203 includes the software context ID of the second software context 203, then the trusted agent 210 will generate a grant/fail message denying passage of subsequent instructions from the debugging tool 202 to the processor 216.

Recall the processor 216 is connected to a bus firewall 226, which is also called a stall block from its function. Specifically, the bus firewall 226 is connected to a bus 228 comprising interconnects. The bus firewall 226 controls communication between access ports of the processor 216 and the bus 228. Accordingly, the bus firewall 226 allows or denies access from software contexts executed by the processor 216 to the non-volatile memory 230, volatile memory 232, and peripherals 234 in response to grant/fault messages from the trusted agent 210 that grant or deny permission for such access. The bus 228 connects, and enables communication between, the processor 216 and the non-volatile memory 230, volatile memory 232, and peripherals 234, subject to the bus firewall's 226 access control. However, when a software context switch occurs, the trusted agent 210 notifies the bus firewall 226 of the switch by a message, and in response the bus firewall 226 stalls any additional communications to the bus interconnect 228 until the context switch is complete. Accordingly, the trusted agent 210 controls the bus firewall 226, further controlling access to the bus 228 and the connected non-volatile memory 230, volatile memory 232, and peripherals 234.

The non-volatile memory 230 and volatile memory 232 are memories outside the processor 216, on the same integrated circuit as the processor 216. For example, the non-volatile memory 230 and volatile memory 232 can include system RAM and Flash memories. The peripherals 234 are hardware-based IP resources, such as specialized computational units. For example, the peripherals 234 can include cryptographic units, universal asynchronous receiver-transmitters (UARTs), universal serial bus (USB) controllers, and serial peripheral interface (SPI) controllers. Different software contexts, such as different ones of the first, second, and third software contexts 220, 222, and 224, utilize and uniquely correspond to different portions of one or more of the non-volatile memory 230, volatile memory 232, and peripherals 234. Usefully, software contexts do not share memory regions or peripherals. Accordingly, the bus firewall 226 controls access to the device memory map of the IC based on the software context currently being executed by the processor 216.

For example, if the processor 216 is currently executing the second software context 222, and the processor 216 switches context to the third software context 224, then the trusted context manager 218 will send the software context ID of the third software context 224 to the trusted agent 210. In response to the message from the trusted context manager 218, the trusted agent 210 will update its authorization rulesets from the database of software context authorizations 212 to reflect the new software context currently being executed by the processor 216. The trusted agent 210 will also send a grant/fault message to the processor firewall 214 denying access, since previous permissions are now obsolete (a software context ID in a previously authorized resource access request 203 will not match the software context ID of the new currently executing software context). Contemporaneously, the processor will send a message to the bus firewall 224 to cause the bus firewall 224 to stall instructions directed from the processor 216 to the non-volatile memory 228, the volatile memory 230, or the peripherals 232 (as further described below). If a subsequent resource access request 203 includes the software context ID of the third software context 224, the trusted agent 210 will generate a grant/fault message granting access to subsequent instructions from the debugging tool 202.

Each of the first, second, and third software contexts 220, 222, and 224 has specific associated system resources such as specific allocated memory regions in the non-volatile memory 230 or the volatile memory 232, or control of specific peripherals 234. Each software context is isolated from other software contexts, meaning that software contexts do not share any associated resources, except in a controlled and authorized way. In some examples, a software context can only share software context-associated resources with another software context if the trusted agent 210 has provided authorization rights for that other software context's resources. The processor 216 can switch contexts (accordingly, switch currently executing processes among different processes that depend on different, independent memory and peripheral resources) based on, for example, hardware interrupts or operating system (OS) job management. The processor 216 is equipped with a mechanism that allows transitions between the different contexts without leaking data, instructions, or resource allocations from one context to another. Such mechanisms correspond to a Trusted Execution Environment (TEE), or a secure enclave processor.

The trusted agent 210 fetches, from the database of software context access authorizations 212, rulesets corresponding to a software context (or contexts) to which the processor 216 is switching during software context switch. The trusted agent 210 then updates the device security state by sending updated permission messages to the processor firewall 214 and the bus firewall 226. Accordingly, the trusted agent 210 sends messages to the processor firewall 214 and the bus firewall 226 revoking permissions for debugging tools 202 corresponding to software contexts (and software context IDs) that the processor 210 has switched from and is no longer executing. The bus firewall 226 acts as a breakpoint, preventing a debugging instruction from accessing protected resources if a context switch begins after the debugging instruction is passed by the processor firewall 214.

After the processor 216 initiates a context switch, the first functional access to the resources corresponding to the switched-to context (and subsequent functional accesses) is stalled until and unless ruleset lookup by the trusted agent 210 is complete. Accordingly, the trusted agent 210 does not send a grant/fault message until the context switch is complete; and a stall is performed by the bus firewall 226, after the processor 216 signals the bus firewall 226, in response to the context switch, as a hardware level process. The processor 216 sends another signal to the bus firewall 226, as a hardware level process, when the context switch is complete. This later signal causes the stall to be removed so that normal messaging resumes. Accordingly, accesses passed by the processor firewall 214 in response to grant/fault messages corresponding to the new (switched-to) software context can be completed as early as the first functional access after a context switch is complete. A stalled transaction is prevented from proceeding until the lookup is completed, after which the stalled transaction is granted or faulted (denied) depending upon authorization.

Figure 3:
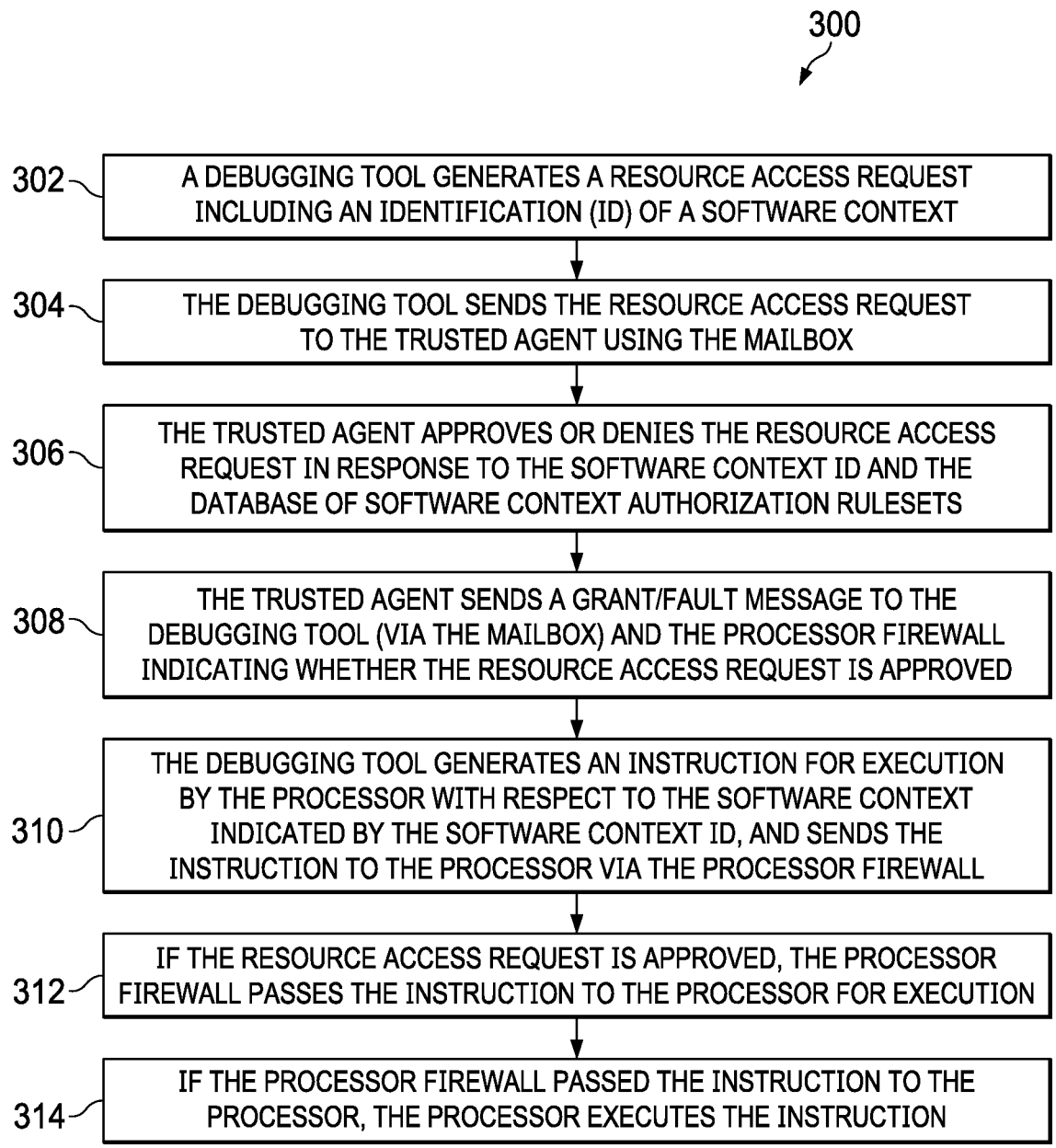
FIG. 3 shows an example process for operating the system of FIG. 2.

FIG. 3 shows an example of a process 300 for authorizing a debugging tool 202 to access a software context in the system 200 of FIG. 2. In step 302, a debugging tool 202 generates a resource access request 203 including a software context ID that indicates one of the software contexts. In step 304, the debugging tool 202 sends the resource access request 203 to the trusted agent 210 using the mailbox 204. In step 306, the trusted agent 210 approves or denies the resource access request 203 in response to the software context ID, and the database of software context access authorizations 212. In step 308, the trusted agent 210 sends grant/fault messages to the debugging tool 202 (via the mailbox 204) and the processor firewall 214 indicating whether the resource access request 203 is authorized. In step 310, the debugging tool 202 generates an instruction for execution by the processor 216, and sends the instruction to the processor firewall 214. In step 312, if the grant/fault message indicates the resource access request 203 is authorized, the processor firewall 214 passes the instruction to the processor 216 for execution. In step 314, if the processor firewall 214 passed the instruction to the processor 216, the processor 216 executes the instruction.

Figure 4:
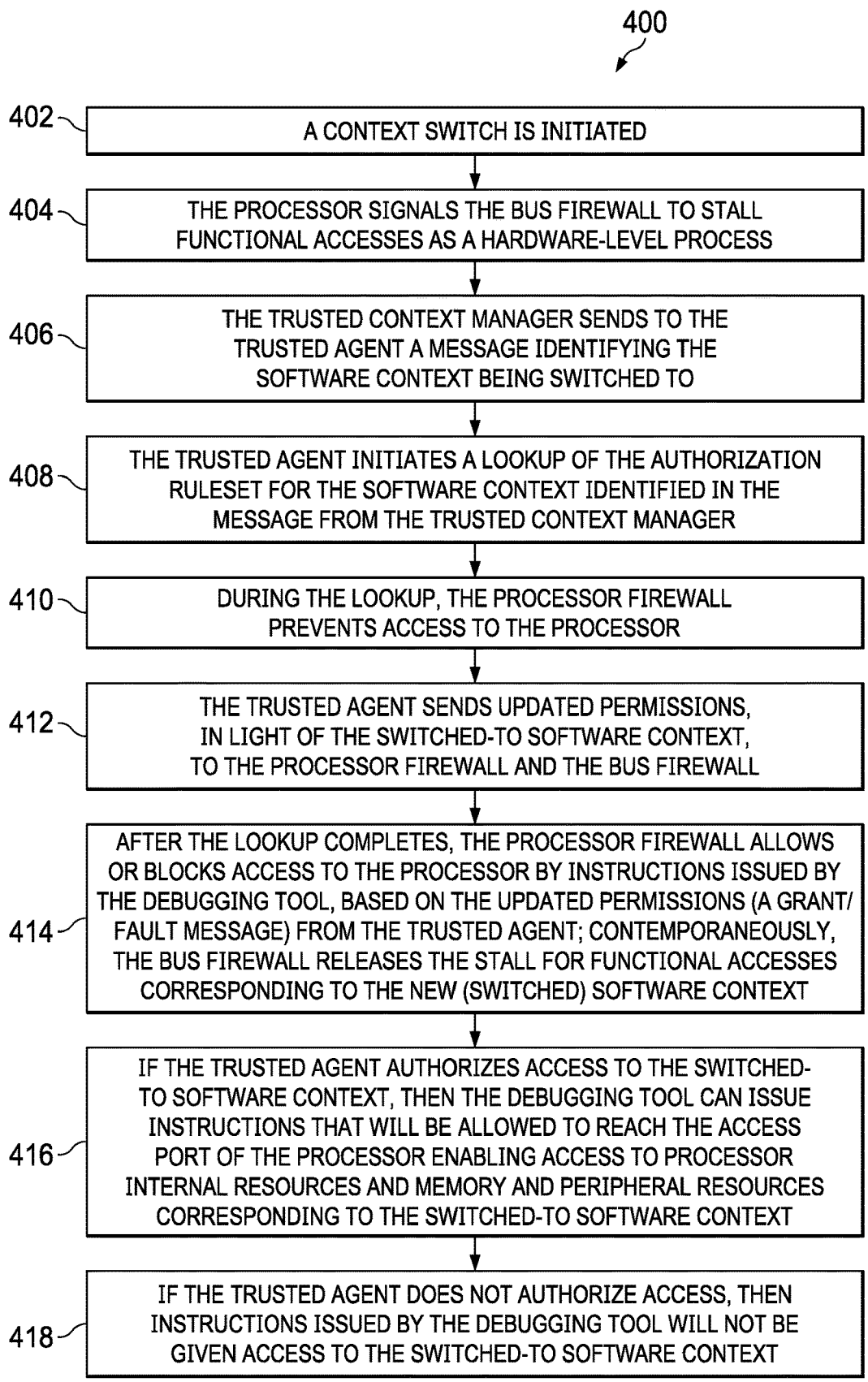
FIG. 4 shows an example process for context switching using the system of FIG. 2.

FIG. 4 shows an example of a process 400 for switching a software context in the system 200 of FIG. 2. In step 402, the processor 216 initiates a context switch to a specific software context. In step 404, the processor 216 signals the bus firewall 226 to stall functional accesses as a hardware-level process. This includes, for example, stalling a first request to the specific software context for functional access. In step 406, the trusted context manager 218 sends a message including an ID of the specific software context to the trusted agent 210. In step 408, the trusted agent 210 initiates a lookup of the authorization ruleset (for example, whether debug is allowed or not allowed) for the specific software context, as identified in the message from the trusted context manager 218. In step 410, during the lookup, the processor firewall 214 prevents access to the processor 216 (for example, by instructions issued by the debugging tool 202). In step 412, the trusted agent 210 sends updated permissions, in light of the specified software context, to the processor firewall 214 and the bus firewall 226 (debugging tools 202 can only receive, and the processor firewall 214 and bus firewall 226 are kept up-to-date to reflect, access permission for the currently running software context).

In step 414, after the lookup completes, the processor firewall 214 allows or blocks access to the processor 216 by instructions issued by the debugging tool 202, based on the updated permissions (a grant/fault message) from the trusted agent 210; contemporaneously, the bus firewall 226 releases the stall for functional accesses corresponding to the new (switched) software context. In step 416, if the trusted agent 210 authorizes access to the switched-to software context, then the debugging tool 202 can issue instructions that will be allowed to reach the access port of the processor 216, enabling access to processor internal resources (such as internal core registers, not shown, of the processor 216) and memory and peripheral resources corresponding to the switched-to software context. In step 418, if the trusted agent 210 does not authorize access, then instructions issued by the debugging tool 202 will not be given access to the switched-to software context.

The process 400 of FIG. 4 enables the system 200 of FIG. 2 to protect multiple independent software contexts (such as the first, second, and third software context 220, 222, and 224) from unauthorized access by debugging tools 202. Further, this process enables secure, consecutive debugging of multiple secure contexts by an authorized user, while not allowing access to other protected software contexts. Accordingly, this process 400 improves protection against reverse-engineering of or tampering with multiple software contexts (such as the first, second, and third software context 220, 222, and 224). In some examples, different software contexts are developed by different end-users who may be interested in protecting their software investment by preventing SRE. Different software contexts are made separately secure, so that secure access to one software context does not enable secure access to other software contexts. In some examples, the number of different, separately secure software contexts is limited only by an amount of available memory.

In some examples, debug functionality is maintained during interrupt service routines, which are routines that are executed when an interrupt is triggered in the processor. In some examples, interrupt services routines can be associated with software contexts different from those previously being executed by the processor. Accordingly, interrupt service routines can cause context switches. As described herein, debug authorization is ensured during entry into and exit from interrupt service routines.

Modifications are possible in the described embodiments, and other embodiments are possible, within the scope of the claims.

In some examples, the mailbox is software-based.

In some examples, the mailbox is only used as a means for the debugging tool to send the resource access request to the trusted agent.

In some examples, only one debugging tool can be connected to a processor at a time, and only one software context runs on the processor at a time.

In some examples, the trusted agent executes a software process to perform debug security control functions.

In some examples, in a multi-core environment, the trusted agent is located in a different processor from the processor.

In some examples, such as in a single-core environment, the trusted agent is located within the processor.

In some examples, resource accesses from the processor to the non-volatile memory, volatile memory, or peripherals are generated by the processor in response to instructions from the debugging tool, and are referred to as resource access instructions.

In some examples, the number of software contexts that can be protected is bounded by or only by the available memory allocated to the system.

In some examples, multiple independent software developers can develop differentiated intellectual properties (IPs) and protect their respective instructions and data after integration of the differentiated IPs into a single system.

What is claimed is:

1. A system, comprising:
    a processor configured to execute in one software context, of multiple available software contexts, at a time, each of the multiple available software contexts having a respective software context identification (ID) among multiple software context IDs, each of which is different;
    a hardware security functional block (HSFB) including a memory configured to store multiple software context authorization rulesets for the multiple available software contexts, respectively, each of the software context authorization rulesets including a corresponding one of the multiple software context IDs, wherein the HSFB is configured to indicate a current software context ID and associated current software context in which the processor is currently executing;
    a processor firewall coupled to the HSFB; and
    a bus firewall coupled to the processor and the HSFB;
    wherein the HSFB is configured to receive, from a debugging tool, a resource access request including a specified software context identification (ID) identifying a specified software context, among the multiple available software contexts, and to determine whether to approve the resource access request based on the current software context ID and the specified software context ID, the HSFB configured to send a message to the processor firewall indicating whether the resource access request is approved;
    wherein the processor firewall is configured to receive, from the debugging tool, an instruction for execution by the processor with respect to the specified software context, and to determine, in response to the message, whether to pass the instruction to the processor for execution; and
    wherein the processor is configured to switch from the current software context to a switched-to software context, among the multiple available software contexts, and in response to initiation of the context switch, the bus firewall is configured to block communication from the processor to a bus during the context switch.

2. The system of claim 1,
    wherein each of the multiple available software contexts is associated with an associated resource including one or more of: a region of non-volatile memory, a region of volatile memory, or a peripheral; and
    wherein the processor is configured to prevent ones of the multiple available software contexts from sharing ones of the associated resources corresponding to different ones of the multiple available software contexts, except as permitted by the HSFB based on the software context authorization rulesets.

3. The system of claim 1, further comprising a mailbox including a transmit register and a receive register;
    wherein the debugging tool is configured to send the resource access request to the HSFB by causing the resource access request to be written to the transmit register; and
    wherein the message is a first message, and the HSFB is configured to send a second message indicating whether the resource access request is approved to the debugging tool by causing the second message to be written to the receive register.

4. The system of claim 1, wherein the HSFB is configured to send the message to the processor firewall indicating the resource access request is approved if the specified software context ID matches the current software context ID.

5. The system of claim 1, further comprising:
    the bus, wherein the bus includes interconnects and is communicatively coupled to the bus firewall; and
    at least one of the following resources, communicatively coupled to the bus: a non-volatile memory, a volatile memory, and a peripheral.

6. The system of claim 5,
    wherein the processor is configured to, in response to the instruction, transmit a resource access instruction requesting access to at least one of the resources;
    wherein the HSFB is configured to send the message to the bus firewall; and
    wherein the bus firewall is configured to determine whether to pass the resource access request to the bus in response to the message.

7. The system of claim 1,
    wherein the processor is configured to, after the context switch completes, signal the bus firewall to release the block.

8. The system of claim 1, wherein the processor is configured to prevent instructions and data from leaking between the multiple available software contexts during the context switch.

9. The system of claim 1,
    wherein the message indicates the resource access request is not allowed if the specified software context ID does not match the current software context ID.

10. The system of claim 1,
    wherein the HSFB is configured to, during the context switch to the switched-to software context, initiate a lookup of a software context authorization ruleset corresponding to the switched-to software context; and
    wherein the processor firewall is configured to, during the lookup, prevent access to the processor by the instruction.

11. A method of operating a processor, comprising:
    executing in a current software context, among multiple available software contexts, using the processor, the current software context being associated with a software context identification (ID) unique to the current software context, wherein the processor stores the software context ID of the current software context while the processor executes the current software context;
    accessing a memory of a hardware security functional block (HSFB) in response to a signal from the processor indicating a switch from the current software context to a switched-to software context of the multiple available software contexts, the signal including the software context ID of the switched-to software context, the memory storing multiple software context authorization rulesets, each including a unique software context ID identifying the associated software context among the multiple available software contexts;

updating information in a processor firewall when the current software context is switched to the switched-to software context indicating that the processor is executing in the switched-to software context having a switched-to software context ID;

blocking, by a bus firewall, communication from the processor to a bus during the context switch in response to initiation of the context switch;

releasing, by the bus firewall, the block after the context switch completes;

receiving, by the HSFB from a debugging tool, after releasing the block, a resource access request including a specified software context ID;

determining, using the HSFB, to grant the resource access request based on the specified software context ID matching the software context ID of the switched-to software context ID;

sending a message from the HSFB to the processor firewall in response to the determining using the HSFB, the message indicating that the resource access request is granted;

receiving, by the processor firewall, an instruction from the debugging tool; and determining, by the processor firewall, in response to the message, to pass the instruction to the processor for execution.

12. The method of claim 11, further comprising:

associating each of the software context IDs with an associated resource including one or more of: a region of non-volatile memory, a region of volatile memory, or a peripheral; and preventing, using the processor, ones of the multiple available software contexts from sharing ones of the associated resources corresponding to different ones of the multiple available software contexts, except as permitted by the HSFB.

13. The method of claim 11, further comprising:

receiving the resource access request from the debugging tool via a transmit register of a mailbox, using the HSFB, wherein the message is a first message; and sending a second message from the HSFB to the debugging tool via a receive register of the mailbox, the second message indicating that the resource access request is granted.

14. The method of claim 11, further comprising:

associating each of the multiple software contexts with an associated resource including one or more of: a region of non-volatile memory, a region of volatile memory, or a peripheral;

transmitting from the processor to at least a specified one of the associated resources via a bus firewall, in response to the instruction, a resource access instruction requesting access to at least one of the resources;

sending the message from the HSFB to the bus firewall; and determining in response to the message, using the bus firewall, to pass the resource access instruction to the specified associated resource.

15. The method of claim 14, wherein:

the blocking includes signaling the bus firewall in response to the processor a initiating the context switch, using the processor, to stall functional accesses from the processor to the bus, which communicatively connects the processor to the associated resources; and the releasing includes signaling the bus firewall after the context switch completes, using the processor, to release the stall.

16. The method of claim 14, further comprising storing an identification of the associated resources of the software contexts in respective ones of the software context authorization rulesets.

17. The method of claim 11, further comprising preventing the processor from leaking instructions and data between the multiple software contexts during a context switch.

18. The method of claim 11, wherein the message is a first message, the method further comprising:

sending, from the processor to the HSFB, a second message including the software context ID uniquely identifying the switched-to software context.

19. The method of claim 18, wherein the processor firewall is configured to prevent access to the processor by the instruction until the processor firewall determines to pass the instruction to the processor for execution in the specified software context.

* * * * *